Oct. 12, 1965

E. S. WEIBEL 3,212,002

MICROWAVE ENERGY POWER METER USING ELECTRON
BEAM DEFLECTION DETECTORS

Filed May 2, 1960

ERICH S. WEIBEL
INVENTOR.

BY David P. Ogden

ATTORNEY.

Oct. 12, 1965
E. S. WEIBEL
3,212,002
MICROWAVE ENERGY POWER METER USING ELECTRON
BEAM DEFLECTION DETECTORS
Filed May 2, 1960
2 Sheets-Sheet 2
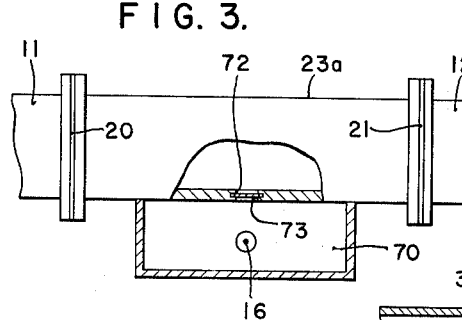
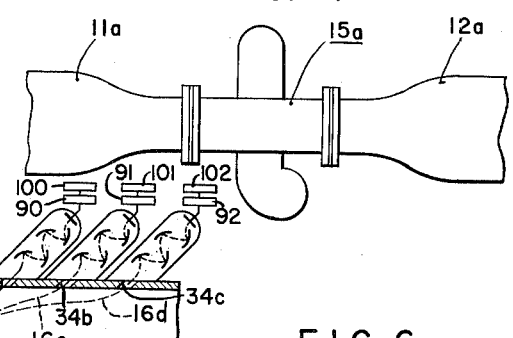
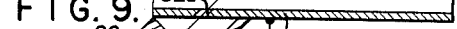
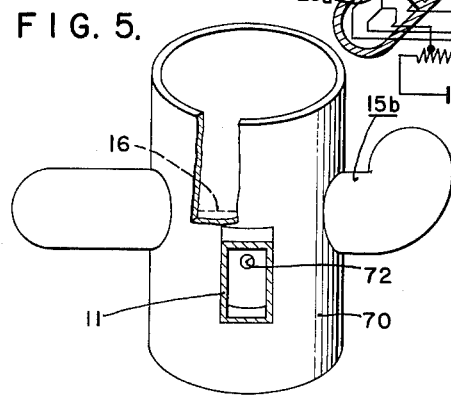
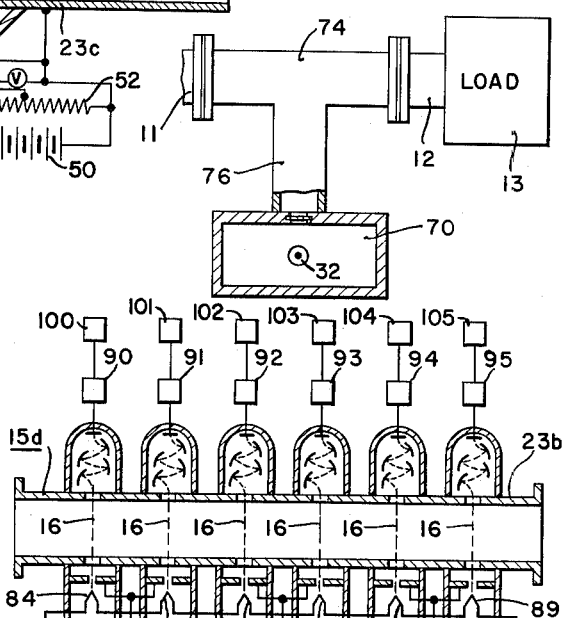
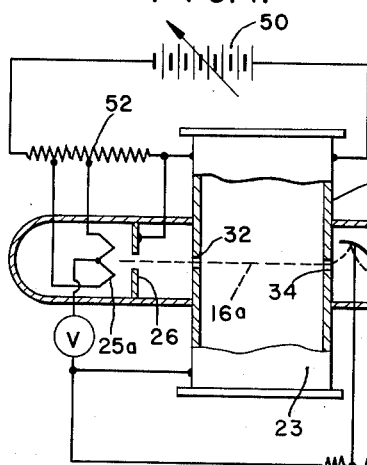
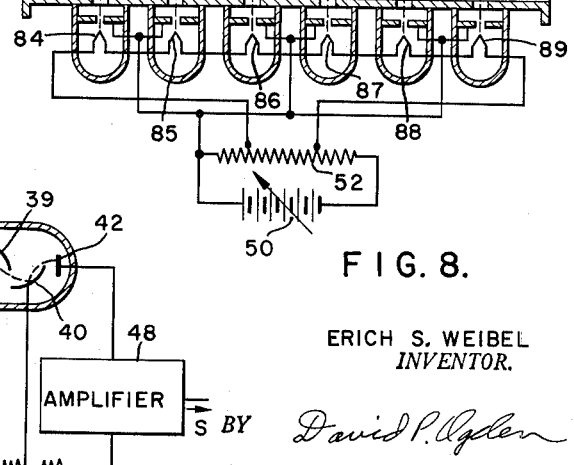
ERICH S. WEIBEL
INVENTOR.
BY
David P. Ogden
ATTORNEY.

United States Patent Office 3,212,002
Patented Oct. 12, 1965

3,212,002
MICROWAVE ENERGY POWER METER USING ELECTRON BEAM DEFLECTION DETECTORS
Erich S. Weibel, Redondo Beach, Calif., assignor, by mesne assignments, to TRW Inc., a corporation of Ohio
Filed May 2, 1960, Ser. No. 26,002
4 Claims. (Cl. 324—95)

The present invention relates to an improved method and apparatus for measuring magnitudes of ultra high frequency electromagnetic energy and more particularly to a method and apparatus for measuring the flow of microwave electromagnetic energy through a wave guide structure.

Simple and reliable power metering devices able to measure microwave power flow through a wave guide are of use for testing and maintaining all types of wave guide devices. The need for measuring large magnitudes of microwave power is becoming increasingly apparent as equipments are being developed having power outputs on the order of 10 kilowatts to 10 megawatts for projecting radar signals beyond the horizon or beyond the atmosphere. In known metering equipments a measurement of the microwave power passing through a wave guide is accomplished by tapping off some of the energy and allowing it to impinge upon a thermistor to change the temperature level of the thermistor. Such equipments are usually arranged with the thermistor in a bridge circuit wherein a heating source is placed adjacent to the thermistor to maintain its conductive characteristic at a level so that the bridge is balanced. When microwave energy impinges upon the thermistor, the temperature is raised slightly so that the heating source must be readjusted to rebalance the bridge circuit. A usual approach to obtaining a signal from such thermistor devices is to measure the heating current. Because of the indirectness of the approach, it may be expected that most such microwave power detection arrangements will drift as much as 10 percent. Although additional compensating networks may be selectively connected to these prior art microwave power meters, the use of such equipments to obtain accuracies of 2 percent or better requires considerable skill of the operator.

With the increasing need for high power microwave power meters and a questionable accuracy of those presently in use, the need for a simple, accurate, and reliable microwave power meter is now clearly recognized by those skilled in this art.

Therefore, a principal object of my invention is to provide a simple and reliable method and apparatus for measuring ultra high frequency wave power by causing an electron beam to traverse a voltage maximum of the wave guide.

Another object is to provide a simple and reliable microwave power meter system.

Another object is to provide a standing microwave detector.

Another object is to provide a microwave power meter in the form of an amplifying device providing a signal suitable for controlling the power output of the microwave system.

In accordance with a simple embodiment of the present invention, an electron beam of a relatively low velocity is directed across an energized wave guide. Electrons flowing across the wave guide perpendicular to the electric field encounter a potential barrier that increases as the square of the voltage within the wave guide until they reach the center of the wave guide where the field is maximum, from which point they will release energy as they approach the further side of the wave guide. Thus if the energy of the electron beam is insufficient to surmount the maximum field within the wave guide portion being traversed, no electrons will flow to the other side and no signal will result. By increasing the electron gun accelerating voltage, the electron beam velocity is increased and the beam crosses a high power wave front within a wave guide. By detecting the lowest beam accelerating voltage causing electrons to reach a target anode, the microwave power traversing the wave guide is determinable.

The subject matter which is regarded as this invention is particularly pointed out and distinctly claimed in the concluding portion of this specification. The invention, however, as to its organization and operation, together with further objects and advantages thereof, will best be understood by reference to the following description taken in connection with the accompanying drawings in which:

FIG. 3 is a sectional view of modification of a connection means suitable for use with the present invention;

FIG. 4 is a sectional view of another modification of a connection means suitable for use with the present invention;

FIG. 5 is a sectional view of further modification of a connection means usable with the present invention;

FIG. 6 is a schematic diagram of another connection means suitable for use with several embodiments which absorb some power from the wave guide system;

FIG. 7 is a diagrammatic view of another embodiment of my invention;

FIG. 8 is a diagrammatic view of another embodiment of my invention; and

FIG. 9 is a diagrammatic view of yet another embodiment of my invention.

Figure 1:
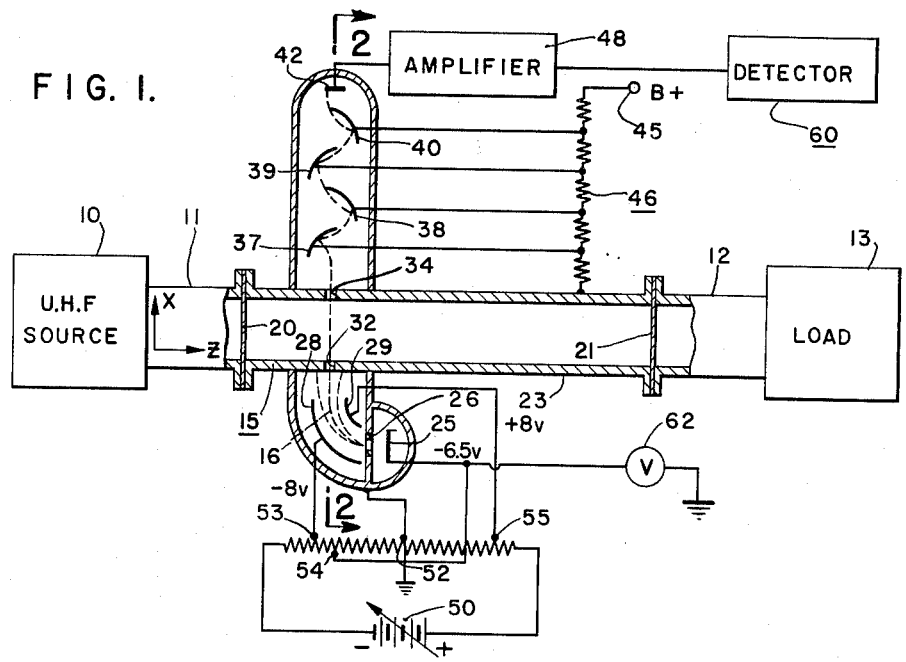
FIG. 1 is a plan view partially in cross-section of one embodiment of my invention.

Referring now to the drawings, where I have shown similar parts by the use of similar numerals, in FIG. 1 there is shown an ultra high frequency or microwave power source 10, such as a radar transmitter, connected by wave guide sections 11 and 12 to a load device 13 such as a radar transmitting antenna. Intermediate to the wave guide sections 11 and 12 is connected one embodiment of a microwave power meter 15 of the present invention.

Since the power meter 15 is conductive of a particle beam such as electron beam 16, it is necessary that the power meter 15 be shielded from strong magnetic fields and be evacuated and secured between the wave guide sections 11 and 12. A simple arrangement for shielding the meter is to construct it with a "Mumetal" cladding. A usual method for accomplishing such evacuation of a portion of a wave guide is to place microwave energy transparent windows 20 and 21 at the ends of an evacuated wave guide portion 23. In the present state of the art, windows are known which will pass ultra high frequency energy through the wave guide portion 23 of power meter 15.

In accordance with the present invention, electrons are drawn from a heated cathode 25 toward an accelerating and focusing electrode 26 so that the electron beam 16 is directed through a velocity discriminator shown as a pair of arcuate (coaxial cylindrical) deflection plates 28 and 29. Thus the electrons are selectively deflected so that only electrons of a predetermined velocity are presented to a small aperture 32 in the wall of the wave guide portion 23 of the power meter 15. During energization of the wave guide portion 23 and when the velocity of these electrons is of sufficient magnitude, the electrons will pass through the wave guide portion 23 to an aligned small aperture 34 and will impinge upon a first dynode 37 of an electron multiplier to cause secondary emission electrons to impinge upon a second dynode 38 and, in a similar manner, energizing the dynodes 39 and 40 of the electron multiplier to provide an amplified current flow to a receptor or anode 42. Each of the electron multiplier dynodes 37, 38, 39, and 40 and the anode 42 are energized from a high voltage power supply 45 with the voltage supplied to the respective electron multiplier dynodes by means of a voltage divider arrangement 46. Since electron multipliers and anode constructions are well known in the present state of the electronic art, these components need not be further explained here. The function of these elements is the usual function of receiving a very small electron flow and amplifying it to an easily detectable current flow, such as .1 milliampere or more, providing desired signal control information. The detection of the current flow is accomplished in the circuit of the anode 42 by the amplifier 48 which provides a control signal.

Referring again to the production and direction of the electron beam 16, the voltage applied to the accelerating electrode 26 and the wave guide portion 23 may be considered ground or zero voltage. A variable power supply 50 connected to a voltage divider network 52 having a plurality of voltage taps 53, 54, and 55 supplies voltage to the cathode 25 which is negative relative to the grounded accelerating electrode 26. Because of this potential, the electron beam 16 will flow through an aperture of the accelerating electrode 26 and into the region of the deflection plates 28 and 29. The voltage of the deflection plates is such that the electrons are repelled by the plate 28 and attracted by the plate 29. As a result, dependent upon their respective velocities, the electrons will be deflected selectively toward the aperture 32. It is preferred that with the present invention most of the electrons will be traveling at a low velocity. However, the velocity of the electrons will vary slightly so that at least a portion of the electrons will not be deflected precisely the same amount as the electron beam 16 passing through the small aperture 32. Thus the deflection plates 28 and 29 function as a velocity discriminator and deflect only those electrons having a precise velocity, an amount which will present them to the aperture 32. Electrons having different velocities are collected on grounded surfaces. These electrons will impinge upon conductive surfaces adjacent to the aperture 32. Since the desired electrons go slowly, the device must be encased by "Mumetal" to shield it from magnetic fields.

By way of example, when the wave guide portion 23 has the dimensions of an "H-band" guide carrying one hundred kilowatts power of three centimeter microwave energy, a negative potential supplied to the cathode 25 of approximately 6.50 volts D.C. will cause the electron beam 16 to traverse the wave guide portion 23. Under such conditions a particular cylindrical configuration of the deflection plates 28 and 29 will require a positive potential of 8 volts on the deflection plate 29 and a negative potential of 8 volts on the deflection plate 28 to direct a major portion of the electron beam 16 through a one millimeter circular aperture 32. In order that the voltages supplied to the cathode 25 and the deflection plates 28 and 29 may be varied in a proportional manner, these voltages are obtained from a voltage divider which is fed from the variable voltage supply 50.

In accordance with this embodiment of the present invention, when the wave guide portion 23 is energized, variation of the supply voltage 50 causes an increasing voltage differential between the cathode 25 and the accelerating electrode 26 and at some voltage setting causes a detectable current flow such as .1 milliampere in the circuit of the anode 42. This current flow will cause energization of the amplifier 48 and a detector means 60. When the detector means 60 is energized, the voltage across a meter 62 will indicate the beam velocity.

Figure 2:
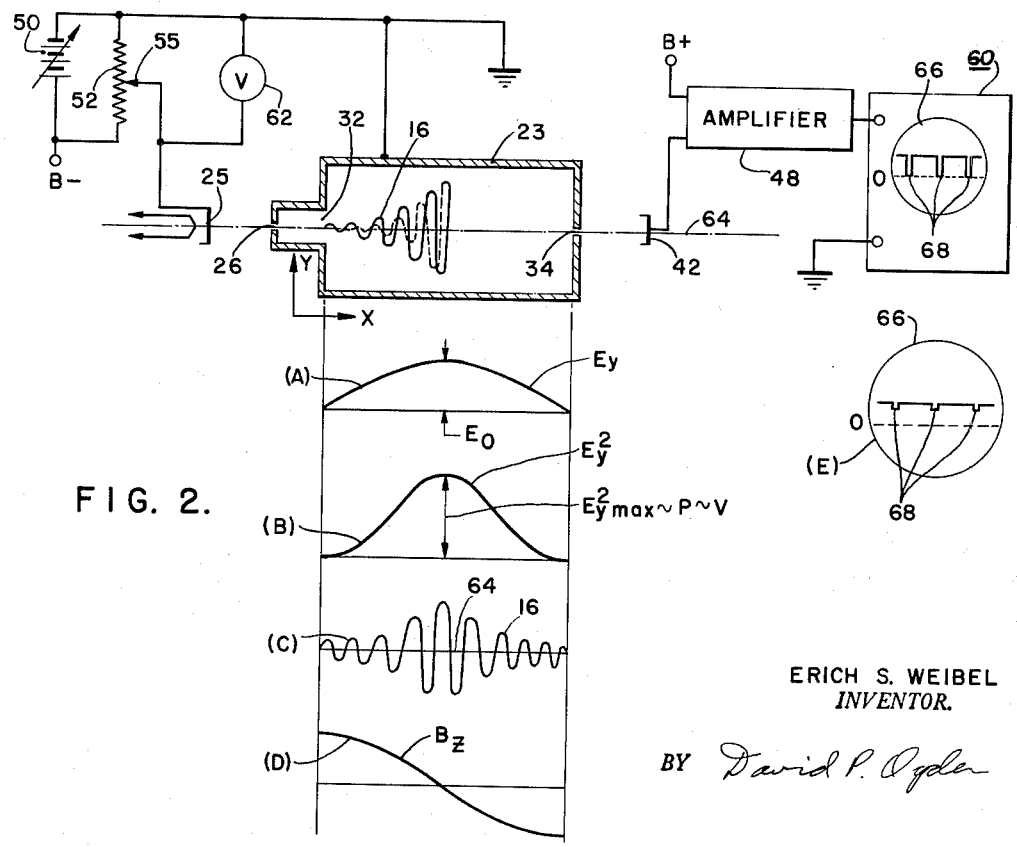
FIG. 2 is a cross-sectional schematic diagram taken along the line 2—2 of FIG. 1 and also shows several curves representative of phenomena occurring in connection with the present invention.

Referring now to FIG. 2 there is shown a simplified schematic cross-sectional view of the apparatus discussed above along with several curves indicating the phenomena occuring. The wave guide portion 23 receives the electron beam 16 directed along an axial plane 64 which bisects the electric field E of the microwave energy. The beam 16 flows from the cathode 25 after being accelerated by the accelerating electrode 26 in accordance with the position of the voltage tap 55 on the voltage divider 52 as indicated by the volt meter 62.

In the particular case illustrated within the wave guide portion 23 (FIG. 2), the velocity of the electron beam 16 is below the critical value at which the beam will traverse the wave guide portion 23 so that when microwave energy is traversing the wave guide no electrons impinge upon the anode 42. As is often the practice with radar or other microwave equipment, the power is placed in the wave guide portion 23 in a series of pulses. When a microwave pulse is present a beam 16 below a critical velocity will not traverse the wave guide portion 23. Thus output as sensed by the amplifier 48 when placed on a cathode ray tube 66 will cause the image on the cathode ray tube 66 to be rectangular as indicated. When no power is traversing the wave guide portion 23 the beam will pass straight across the wave guide portion 23. When microwave power pulses traverse the wave guide system, the current flow sensed by the magnetic amplifier 48 will be sharply reduced. Three such microwave pulses are indicated at 68 in the cathode ray tube 66.

Also in FIG. 2 is illustrated a curve A representative of the field voltage $E_y$ distribution within the wave guide portion 23 across which the electron beam 16 is driven. This curve A is sinusoidal. A curve B represents $E_y^2$ whose maximum value is proportional to the power being transmitted through the wave guide portion 23 and is similarly proportional to the accelerating voltage necessary to drive the electron beam 16 across the wave guide portion 23. A curve C shows a representative path of an electron within the electron beam 16 as it traverses the wave guide portion 23. As the electrons enter the wave guide portion 23 they are caused to oscillate within the wave guide. These oscillations increase proportionately to the field voltage $E_y$ whereby the envelope of the oscillation of the curve C is substantially equal to the sinusoidal configuration of curve A. In FIG. 2 there is also shown a curve D, representative of the magnetic field B within the wave guide portion 23. This magnetic field B is 90° out of phase with electric field $E_y$.

As a result of the electron motion and the magnetic field there is developed a force in the first half of the wave guide tending to cause the electron beam to slow down and to cause it to return to the aperture 32 of its origin. This force is the same type of force utilized in an ordinary motor. Although the building up of oscillations as shown by FIG. 2 or the curve C associated therewith does take some energy from the traveling wave, the decay of these oscillations either by the electrons passing through the aperture 32 to the other aperture 34 or through the aperture 32 and returning to the region of the aperture 32, causes the energy to be returned to the wave guide much like a magnetic coil will cause energy to flow back into an electrical system when the magnetic field collapses. As a result, the total loss of energy because of the use of the electron beam 16 is very, very small.

When the voltage or velocity of the electron beam 16 is below the critical value, all of the electrons will fall back toward the aperture 32 whereupon no signal is received by the amplifier 48 during power transmission pulses. On the other hand, when the beam 16 is presented to the wave guide portion 23 with sufficient energy to traverse the wave guide portion 23, the signal received by the amplifier 48 will be continuous and substantially uniform whereby, as shown in a portion E of FIG. 2 showing the cathode ray tube 66, the power pulses 68 will cause a very small, if any, deflection of the cathode ray beam presentation.

As will be seen from the following mathematical discussion, the accelerating voltage required to cause the electron beam 16 to traverse the wave guide portion 23 is proportional to the power passing through the wave guide and is a function of the dimensions of the wave guide and the voltage distribution in the region where the energy is being detected. Usually the wave guide dimensions will be fixed during any power measurements. The electric field E and magnetic field B in a rectangular wave guide portion 23 (FIG. 2), having cross-sectional dimensions $a$ and $b$ in the $x$ and $y$ directions, respectively, and carrying power in one direction are $$E_y = E_0 \sin(\alpha x) \sin(\omega t - kz) \tag{1}$$

$$B_x = \frac{k}{\omega} E_0 \sin(\alpha x) \sin(\omega t - kz) \tag{2}$$

$$B_z = \frac{\alpha}{\omega} E_0 \cos(\alpha x) \cos(\omega t - kz) \tag{3}$$

Where:
$E_0$=the maximum electric field,
$E_y$=the instantaneous electric field in the $y$ direction,
$\omega = 2\pi f$,
$\alpha = \pi/a$, $$k \sqrt{\frac{\omega^2}{c^2} - \frac{\pi^2}{a^2}}$$

$c$=velocity of light,
$B_x$=the instantaneous magnetic field in the $x$ direction, and
$B_z$=the instantaneous magnetic field in the $z$ direction (FIG. 1).

The power carried by the wave is given by the well known formula $$P = \frac{abkE_0^2}{4\mu_0\omega} \tag{4}$$

Where:
$\mu_0 = 4\pi \ 10^{-7}$ volt-seconds/amp. meter $= 1{,}256 \ 10^{-6}$ vs./am. (sometimes called "the permeability of a vacuum").

The motion of an electron, mass $m$, charge $e$, in the $y$ direction (FIG. 2) is given by Newton's law $$m\frac{d^2y}{dt^2} = eE_y = eE_0 \sin(\alpha x) \sin(\omega t - kz) \tag{5}$$

The velocity $v_y$ in the $y$ direction is obtained by integration of the second sine factor with respect to time $t$; assuming $x$ to be fixed. (This is permissible since $x$ changes very slowly.)

$$v_y = \frac{dy}{dt} = -\frac{eE_0}{m\omega} \sin(\alpha x) \cos(\omega t - kz) \tag{6}$$

The magnetic field in the $z$ direction (FIG. 1) acts on this electron because of velocity $v_y$ according to Lorentz, giving rise to a force $F_x$ in the $x$ direction $$F_x = ev_yB_z = -\frac{e^2E_0^2\alpha}{m\omega^2} \sin(\alpha x) \cos(\alpha x) \cos^2(\omega t - kz) \tag{7}$$

Since the $\cos^2$ term on the right side is rapidly oscillating, it can be replaced by its time average $\cos^2(\omega t - kz) \to \frac{1}{2}$. Thus the force $F_x$ in the $x$ direction can be simplified to $$F_x = -\frac{d}{dx} \frac{e^2E_0^2}{4m\omega^2} \sin^2 \alpha x \tag{8}$$

That is to say, this force $F_x$ can be derived from the potential $$\psi = \frac{e^2E_0^2}{4m\omega^2} \sin^2 \alpha x \tag{9}$$

by combining Equations (8) and (9)

$$F_x = -\frac{d}{dx}\psi \tag{10}$$

this potential has the form (FIG. 2B) and has a maximum value when $$\psi \max = \frac{e^2E_0^2}{4m\omega^2} \tag{11}$$

From this it is evident that the force $F_x$ tend to drive the electron towards the narrow walls of the wave guide. If a particle enters the wave guide it will have to "climb over" to potential barrier. $\psi$ max to arrive at the other side of the wave guide portion 23. If the particle is accelerated by an electrostatic voltage V before injection through the aperture 32, the condition for just traveling over the potential hump is $$eV = \psi \max = \frac{e^2E_0^2}{4m\omega^2} \tag{12}$$

Combining the Equations (4) and (11), one finds that the power flowing through the guide is proportional to the voltage V $$P = \frac{m}{\mu_0 e} k\omega abV \tag{13}$$

This relation can be written also in the more convenient form $$P = \left(4\pi^2 \frac{mc}{\mu_0 e}\right) \cdot \left(\frac{b}{\lambda}\sqrt{\left(\frac{a}{\lambda}\right)^2 - \frac{1}{4}}\right) \cdot V \tag{14}$$

where the factor $$4\pi^2 \frac{mc}{\mu_0 e} = 53.5 \frac{\text{kwatt}}{\text{volt}}$$

is a universal constant, and the factor $$\frac{b}{\lambda}\sqrt{\left(\frac{a}{\lambda}\right)^2 - \frac{1}{4}}$$

depends on the geometry alone, $\lambda$ being the wave length $c/f$ of the microwave power.

For one particular guide (H band) where $a = 2.85$ cm., $b = 1.25$ cm., and $f = 9.2$ kmc.; $\lambda = 3.2$ cm.; one finds $$\frac{b}{\lambda}\sqrt{\left(\frac{a}{\lambda}\right)^2 - \frac{1}{4}} = .288 \tag{15}$$

so that $$P = 15.4 \frac{\text{kwatt}}{\text{volt}} \cdot V \tag{16}$$

It is clear that the sensitivity can be improved by making $b$ and/or $a$ smaller, since thereby the factor of Equation (15) is reduced. However, $a$ must always be greater than $\lambda/2$, to maintain transmission through the wave guide. By making $b$ approach zero and/or $a$ approach $\lambda/2$, the sensitivity of the power meter can be increased without limit. On the other hand, a practical limitation results from the fact that power losses to the wave guide walls are simultaneously increased.

Usually it is most desirable to place the apertures 32 and 34 on a diametric plane of the wave guide portion 23 where maximum electric field voltage E is encountered. When the wave guide system is conductive of near maximum power levels, insertion of electrons at an off-center location is likely to foment multipactoring. Moreover, the accelerating voltage necessary to cause the electron beam 16 to traverse the wave guide portion 23, even in the presence of substantial amounts of microwave power, is a relatively small voltage and the axial location requires a maximum accelerating voltage.

Because of this low voltage phenomena the measurement of low wave guide power levels is somewhat more difficult than the measuring of power levels on the order of one hundred kilowatts or more. This problem may be substantially overcome by one of several approaches illustrated in FIGS. 3, 4, 5, and 6.

Referring now to FIG. 3, there are shown wave guide sections 11 and 12 connected to a wave guide portion 23a. A resonant cavity 70 receives power from the wave guide portion 23a through an aperture 72. Instead of the two microwave energy windows 20 and 21, a single window 73 may be used. As the microwave power enters the cavity 70, it causes oscillatory fields within the cavity in the form of resonant oscillations which will build up to magnitudes of the electric field E substantially above those detectable within the wave guide portion 23a itself. As a result, the insertion of the electron beam through the aperture 32 at the point of maximum field voltage within the resonant cavity 70, will result in the detection of the voltage or power level which is a predeterminable order of magnitude greater than that traversing the wave guide system. Depending upon the effective Q of the resonant cavity 70, the resonant cavity carries fields on the order of 10 to 20 times greater than those within the system described in connection with FIG. 1. Thus the arrangement shown in FIG. 3 will measure accurately power levels of the order of 0.1 to 0.05 times the system illustrated specifically in FIG. 1.

Because of the utilization of the resonant cavity 70, a portion of the energy of the wave guide is extracted to drive the resonant fields within the cavity 70. This results in a reduction of the power traversing the wave guide system when the cavity 70 is receptive of power. On the other hand, the traversing of a wave guide as shown by the microwave power meter 15 by an electron beam as shown on FIG. 1 does not absorb appreciable energy from the wave guide.

Another approach which may be expected to create some power consumption and which will allow detection of wave guide energy of magnitudes from ¼ to ⅓ of those detectable by the system shown in FIG. 1 is represented by the construction of FIG. 4 where the wave guide section 11a is narrowed down and the wave guide section 12a is expanded. The electric field voltages in the narrower portion of the wave guide, where the microwave energy power meter 15a is located, are 3 to 4 times greater than the field voltages in the larger cross sections of the wave guide sections 11a and 12a.

Another type of field amplifying arrangement is shown in FIG. 5 where a cylindrical resonant cavity 70 is energized in the $TE_{01}$-mode from a wave guide through a coupling window 72. In this embodiment the microwave power meter 15b will require, depending on the Q, as much as 400 times the accelerating voltage required in the FIG. 1 construction to drive the electron beam 16 through the resonating waves. Obviously such a system may be used to detect power levels on the order of one kilowatt or less. Usually the cavity 70 of FIG. 5 is intermittently switched into the system in place of load 13.

Each of the systems shown in FIGS. 3, 4 and 5 has the apparent disadvantage that the change of the configuration of the wave guide system and/or the tapping of power therefrom causes certain power losses within the wave guide. However, this power loss problem may be completely circumvented by the intermittent interrogation of the microwave energy power levels within the wave guide system. Such intermittent interrogation is entirely feasible by the use of a power divider arrangement 74 as shown schematically in FIG. 6. Usually when the load 13 is intermittently powered as in the usual case of a pulsed radar system, the disconnection of the load 13 may be done in such a way that power from the transmitter automatically impinges upon the resonant cavity 70 which is connected to a wave guide stub 76 of the power divider arrangement 74. When only very short interrogations are necessary for a particular system, the cavity 70 may be energized on the order of a few microseconds between transmission of power pulses to the load 13. By such an arrangement no power is absorbed by the microwave power meter, connected to detect the field voltages in the cavity 70, during the period of transmission of microwave power to the load 13. Thus even substantial power consumption within the microwave detection system has little, if any, effect on the power being supplied to the load 13.

In addition to the above-described uses of the microwave power meter 15 for detection of power transmission, there are many other modifications and uses which will occur to those skilled in the art. Such modifications include the regulation of current flow in an electron or particle beam device in accordance with transverse transmissions of microwave energy at relatively high power levels, regulation of power levels being conducted by a wave guide system, and/or detection of standing waves within a wave guide system.

Referring now to FIG. 7, there is shown another embodiment of the present invention. In the microwave power meter 15c, a source having a range of velocities shown for simplicity as a filament 25a, having applied thereacross a range of voltage so that the voltage differential between portions of the filament 25a and the accelerating electrode 26, creates an electron beam 16a containing electrons of slightly different energy and velocity levels. This electron beam 16a is not passed through a velocity discriminator as discussed above but is instead directed by the accelerating electrode 26 through the aperture 32 toward the aperture 34 within the wave guide portion 23 (FIG. 7). Since the electron beam 16a contains electrons of different energy levels, not all of the electrons will reach a critical velocity at the same potential setting of the variable voltage source 50.

Assume, for a given microwave power level within the wave guide portion 23, that the critical electron beam velocity is obtained when the effective accelerating voltage is equal to or greater than that between the central portion of the filament 25a and the accelerating electrode 26. Under these conditions, approximately ½ of the electrons available from the heated filament 25a will travel at a sufficient velocity to traverse the microwave fields between the apertures 32 and 34. The impinging of these electrons upon the dynodes 37, 38, 39 and 40 of the electron multiplier will create a certain magnitude of current flow in the circuit of the anode 42. As a result, the output signal S from the amplifier 48 will be in one level which, for convenience, may be termed a reference level.

If the microwave power level within the wave guide changes and there are no other parametric changes in the system, then the signal S within the circuit of the amplifier 48 will change in an inverse manner. In other words, if the microwave power level increases, the number of electrons within the beam 16a traversing the region with the apertures 32 and 34 will decrease, whereby the output signal S will decrease. Conversely, if the microwave power level within the wave guide portion 23 decreases, the signal S from the amplifier 48 will increase.

It will be recognized by those skilled in the art that the magnitude of the output signal S from the amplifier 48 as well as the flow of electrons within the electron beam 16 is being modulated by the microwave power level. Moreover, this modulation is very similar to an automatic volume control (AVC) of the ordinary superheterodyne. Once this similarity is recognized, several uses for this signal may be envisioned. Probably one of the most important uses is to control the microwave power level of the transmitting source supplying energy to the load 13 through the wave guide portion 23. Thus, my invention is readily adapted for use as an automatic power modulating device of microwave transmission systems.

Another embodiment of my invention is illustrated in FIG. 8 wherein the filament 25a has been divided into six filaments 84 through 89 creating six electron beams 16 to a wave guide portion 23b and the amplifier 48 and the detector 60 have been replaced by six amplifiers 90 through 95 and six detectors 100 through 105. By selecting an accelerating voltage and causing the flow of electrons across the wave guide portion 23b from only a few of the electron gun systems it is now feasible to detect very precisely a particular voltage at which electrons are of a velocity sufficient for traversing the tube.

On the other hand, a standing wave detection system is illustrated by FIG. 8. If the electron beams 16 are at the sensitivity and are spread over a length of $\lambda/4$ it becomes feasible to detect any standing waves within the wave guide portion 23b. When this system (FIG. 8) is connected to modulate the signals of cathode ray tubes 66 as illustrated in FIG. 2, a portion of the cathode ray tube signals will indicate a rectangular wave and a portion will indicate substantially continuous electron beam flow (FIG. 2E). Thus, this arrangement of the power meter 15a will detect any standing waves within the wave guide portion 23b.

As shown in FIG. 9, the beam 16 may be submitted at an angle to the wave guide portion 23c. For the reasons set forth above, it is preferred that the beam 16 be maintained in the axial plane 64 (FIG. 2), bisecting the electric field of the energized wave guide section 23c. When presented at an angle to the wave guide portion, the beam 16 contains a longitudinal velocity component. When the angle of presentation is about 45 degrees, as illustrated, the longitudinal and lateral velocity components are about equal. Since the lateral velocity is the one which must be of a certain magnitude to cause traversal of the energized wave guide portion 23c, this component controls the obtaining of a signal S. On the other hand, the longitudinal component is not materially affected by the microwave energy because it does not cause the traversal of the microwave energy with the field orientation present.

Careful consideration of what occurs shows that since the lateral velocity of the beam decreases near the center of the electric field when the oscillations build up to a maximum, a charged beam at or near the minimum critical velocity will take a substantially greater time to traverse the wave guide portion 23c than a high velocity beam whereby it approaches the farther wall a greater longitudinal distance from the small oblique admission aperture 32a than one traveling at a higher velocity. Thus a relatively high velocity beam such as beam 16b accelerated with a voltage as much as 25 volts traverses the wave guide portion 23c quickly to exit through a nearest oblique aperture 34a. A slower velocity beam 16c requires a slightly longer traversal time whereby the longitudinal velocity component acts upon the beam a greater amount and the beam 16c exits through an aperture 34b. As the electron beam approaches the minimum critical transverse velocity, the longitudinal component of the beam has an even greater effect as illustrated by a beam 16d whereby the beam 16d exits from the wave guide section 23c through a further displaced aperture 34c. In connection with the present invention, one arrangement allowing desired criticality of measurement of the power microwave energy traversing the portion 23c is constructed by utilizing an electron gun having a variable velocity electron gun as shown in FIG. 7 (rather than a cathode as shown in FIG. 1), creating a range of velocities whereby a portion of the electrons are traveling rapidly enough to exit through the aperture 34a; another portion exits through the aperture 34b; and a third portion exits through the aperture 34c. Intermediate velocity electrons will impinge upon and be lost on the wave guide wall in the regions of the apertures 34a, 34b, and 34c. By detection of the relative electron flow through the plurality of apertures 34a, 34b, and 34c and balancing the flow between the extreme aperture 34a and 34c by control of the electron gun accelerating voltage, a very sensitive microwave energy power meter is created. In this arrangement, cut-off velocity of the beam need not be approached and the balancing of the signals of the extreme apertures results in an error signal with changes of sign at the desired balancing voltage.

While there have been shown and described particular embodiments of my invention, other modifications may occur to those skilled in the art. For instance, other wave guide shapes than those specifically illustrated may be used to provide a field voltage E which is more sharply detectable. Moreover, it is recognized that in certain applications it may be desirable to use a particle beam other than an electron beam or means other than what is usually referred to as an electron gun to generate a source of charged particles of controllable velocities. Furthermore, it is recognized that other arrangements than an anode may be used to sense the electron passage through the aperture 34; various sensitized tapes, etc. It is intended, therefore, by the appended claims to cover all such modifications as come within the true spirit and scope of the present invention.

I claim:

1. A microwave energy power meter comprising: an evacuated wave guide section conductive of microwave energy with one wall portion defining a first small aperture and an opposite wall defining a plurality of other small apertures, each aperture being located on a plane of said wave guide section bisecting the electric field thereof, the other apertures being longitudinally spaced relative to the first aperture; a low velocity electron gun arranged to direct a beam of electrons having a range of velocities through the first aperture toward the other apertures; a plurality of anodes each arranged to conduct current as a function of the number of electrons passing through respective ones of the other apertures; means for detecting selectively the anode currents; and means for accelerating said electron beam through said field with a voltage that produces substantially equal electron flow through two of said other apertures during microwave energization of said wave guide section.

2. A microwave energy power meter comprising: an evacuated wave guide section conductive of microwave energy with a wall portion defining a first small aperture and an opposite wall portion defining a second small aperture, and a third small aperture, the first, second, and third apertures being located along a median plane at right angles to the electric field of said section with the second and third apertures each being longitudinally spaced in the same direction but different amounts in relation to the first aperture; a low velocity electron gun system arranged to direct a beam of electrons having a range of velocities through the first aperture toward the second and third apertures; a pair of anodes respectively energizable as a function of the relative number of electrons passing through the second and third apertures; and means within said gun system for selectively varying the range of velocities of the beam until said anodes conduct equal current during conductance of microwave energy.

3. A microwave energy power meter comprising: a wave guide section conductive of microwave energy; a first wall portion of said section defining a first small aperture; a second wall portion of said section defining a second small aperture, the apertures being located on a median plane of said section at right angles to the electric field in said section and being longitudinally spaced along said section; a low velocity electron gun system arranged to direct a beam of electrons having a range of velocities at an angle to said first wall portion through the first aperture toward the second aperture; an anode arranged to conduct current as a function of the relative number of electrons passing through the second aperture; means within said gun system for selectively adjusting the accelerating voltage of the beam to the minimum value at which a substantial number of the electrons will traverse said section and pass through the second aperture during microwave energization of said section; and detector means energizable as a function of the anode current to provide a signal indicative of the microwave energy in said section.

4. A microwave energy power meter comprising: a wave guide section conductive of microwave energy; a first wall portion of said section defining a first small aperture; a second wall portion of said section defining other small apertures, all of the apertures being located on a median plane at right angles to the electric field of said section and being longitudinally spaced along said section with said other apertures being adjacent and all being in one direction relative to the first aperture; a low velocity electron gun system arranged to direct a beam of electrons having a range of velocities at an angle to said wall portion through the first aperture toward the other apertures; means within said gun system for selectively varying the range of velocities of the beam until a minimum detectable number of an equal number the electrons will traverse said section and pass through the two most widely separated other apertures during microwave energization of said section; and detector means energizable as a function of the passage of electrons through the other apertures to provide a signal indicative of the microwave energy in said section.

References Cited by the Examiner
UNITED STATES PATENTS 2,289,770 7/42 Fremlin _____ 324—95 X
2,524,283 10/50 Blitz _____ 324—121 X

OTHER REFERENCES

A Method of Measuring the Field Strength of High-Frequency Electromagnetic Fields, by Rohn Truell, reprinted from the Proceedings of The Institute of Radio Engineers, vol. 36, No. 10, October 1948, 3 pages.

Microwave Power Measurements Employing Electron Beam Techniques, by Harold A. Thomas, vol. 45, No. 2, February 1957, pages 205–211.

WALTER L. CARLSON, *Primary Examiner.*

BENNETT G. MILLER, FREDERICK M. STRADER, *Examiners.*